(12) United States Patent
Kim

(10) Patent No.: US 6,701,136 B2
(45) Date of Patent: Mar. 2, 2004

(54) METHOD FOR AUTOMATICALLY CHANGING TRANSMISSION POWER OF THREE-SECTOR BASE STATION IN MOBILE COMMUNICATION SYSTEM

(75) Inventor: Won-Moo Kim, Ichon-shi (KR)

(73) Assignee: Hyundai Electronics Co., Ltd. (KR)

( * ) Notice: Subject to any disclaimer, the term of this patent is extended or adjusted under 35 U.S.C. 154(b) by 526 days.

(21) Appl. No.: 09/759,048

(22) Filed: Jan. 12, 2001

(65) Prior Publication Data

US 2001/0008834 A1 Jul. 19, 2001

(30) Foreign Application Priority Data

Jan. 14, 2000 (KR) .......................................... 2000-1729

(51) Int. Cl.[7] .............................. H04B 7/00; H04Q 7/20
(52) U.S. Cl. ................... 455/115.1; 455/67.11; 455/522; 370/335; 370/342
(58) Field of Search .............................. 455/507, 522, 455/67.11, 115.1, 127.1, 69; 370/318, 320, 335, 342, 311

(56) References Cited

U.S. PATENT DOCUMENTS

| | | | | |
|---|---|---|---|---|
| 5,715,526 A | * | 2/1998 | Weaver et al. .............. 455/126 |
| 5,893,035 A | * | 4/1999 | Chen .......................... 455/522 |
| 5,933,787 A | * | 8/1999 | Gilhousen et al. .......... 455/438 |
| 6,006,111 A | * | 12/1999 | Rowland ..................... 455/561 |
| 6,011,787 A | * | 1/2000 | Nakano et al. ............. 370/335 |
| 6,160,999 A | * | 12/2000 | Chheda et al. ................ 455/69 |
| 6,618,432 B1 | * | 9/2003 | Ganesh ....................... 375/147 |

* cited by examiner

Primary Examiner—Edward F. Urban
Assistant Examiner—Simon Nguyen

(57) ABSTRACT

A method for automatically changing transmission power of a three-sector base station in a mobile communication system is disclosed. The mobile communication system includes a base station manager (BSM) and a base station having a base station control processor (BCP), a plurality of RF Up-converters and a memory. In the method for automatically changing the transmission power of three-sector base station in accordance with the present invention, the optimal transmission attenuation values for multiple CDMA channels in each sector are detected at the three-sector base station and set to the corresponding RF Up-converters. Therefore, the detection and setting of the optimal transmission attenuation values for multiple CDMA channels are simply performed, thereby reducing time and cost for the detection and setting. Also, in the present invention, the cell-plan device is not necessary, which reduces expense to detect the optimal transmission attenuation values.

32 Claims, 13 Drawing Sheets

US 6,701,136 B2

METHOD FOR AUTOMATICALLY CHANGING TRANSMISSION POWER OF THREE-SECTOR BASE STATION IN MOBILE COMMUNICATION SYSTEM

FIELD OF THE INVENTION

The present invention relates to a method for automatically changing a transmission power; and, more particularly, to a method for automatically changing a transmission power by automatically setting RF Up-converters as optimal attenuation values of multiple CDMA channels respectively, which are automatically detected.

DESCRIPTION OF THE PRIOR ART

In general, a three-sector three-channel base station could serve the different number of CDMA channels in each of the $\alpha$, $\beta$ and $\gamma$ sectors, in this case, one CDMA channel in one sector is called a sub-cell. If the three-sector base station serves the three CDMA channels, the number of sub-cells being nine. Therefore, each of sub-cells could have one CDMA channel, and the number of the RF Up-converter which is located in the three-sector base station is equal to the number of the sub-cells.

Up to now, when an operator tries to detect the attenuation value of the three-sector base station in mobile communication system, he moves to the three sector base station in foot with the cell-plan device, and manually measures the transmission attenuation values which are transmission values of multiple Up-converters with the cell-plan device. Then, the operator checks the result lists of the above to find optimal transmission attenuation values and set the result values to the multiple Up-converters of the three sector base station.

However, the conventional three-sector base station transmission power changing method is operated manually the expensive cell-plan device, which cause waste of time in checking and setting the optimal transmission attenuation values and cause cost increasing in checking the transmission attenuation values.

SUMMARY OF THE INVENTION

It is, therefore, an object of the present invention to provide a method for automatically changing a transmission power in the three-sector base station.

In accordance with an aspect of the present invention, there is provided a method for automatically changing transmission power of a three-sector base station in a mobile communication system, wherein the mobile communication system includes a base station manager (BSM) and a base station having a base station control processor (BCP), a plurality of RF Up-converters and a memory, the method comprising the steps of: a) receiving a transmission attenuation value change command and a call completion rate threshold value; b) transmitting the transmission attenuation value change command and the call completion rate threshold value to the BCP; c) detecting optimal transmission attenuation values for CDMA channels in an $\alpha$ sector and storing the optimal transmission attenuation values into the memory; d) detecting optimal transmission attenuation values for CDMA channels in a $\beta$ sector and storing the optimal transmission attenuation values into the memory; e) detecting optimal transmission attenuation values for CDMA channels in a $\gamma$ sector and storing the optimal transmission attenuation values into the memory; f) detecting optimal transmission attenuation values for multiple CDMA channels in the $\alpha$ sector in case of a handoff between the $\alpha$ and the $\beta$ sectors and storing the optimal transmission attenuation values into the memory; g) detecting optimal transmission attenuation values for multiple CDMA channels in the $\alpha$ sector in case of a handoff between the $\beta$ and the $\gamma$ sectors and storing the optimal transmission attenuation values into the memory; h) detecting optimal transmission attenuation values for multiple CDMA channels in the $\alpha$ sector in case of a handoff between the $\gamma$ and the $\alpha$ sectors and storing the optimal transmission attenuation values into the memory; and i) selecting final optimal transmission attenuation values for the multiple channels in each of the sectors and setting each the final optimal transmission attenuation value to corresponding RF up-converter.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
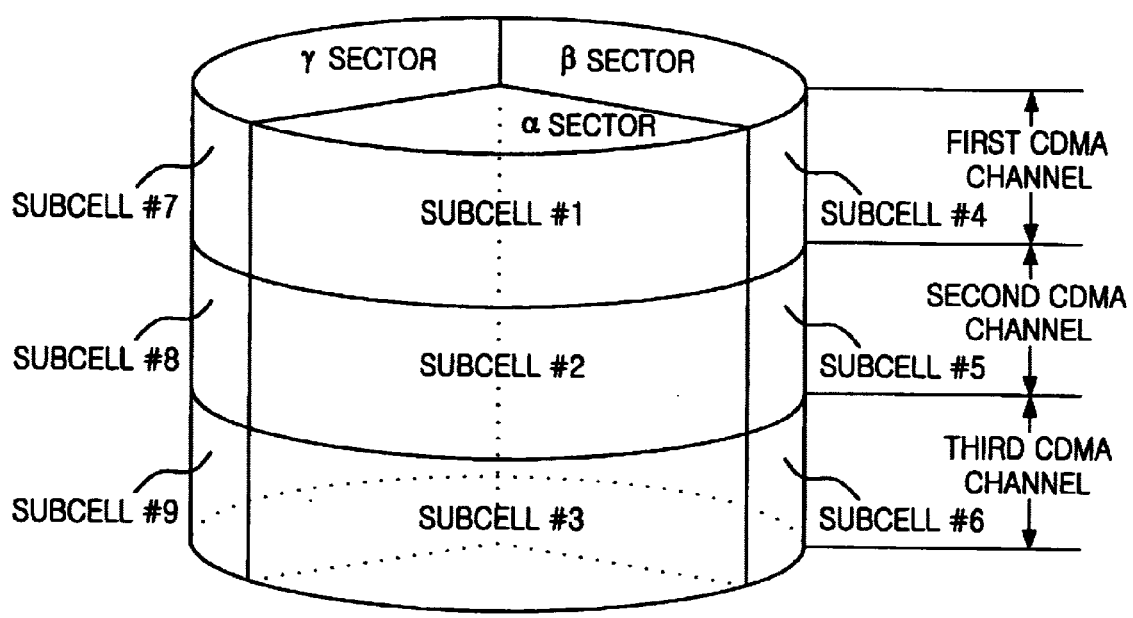
FIG. 1 is a schematic diagram showing sub-cell structure of three-sector three-channel base station in a general mobile communication system.
Figure 2:
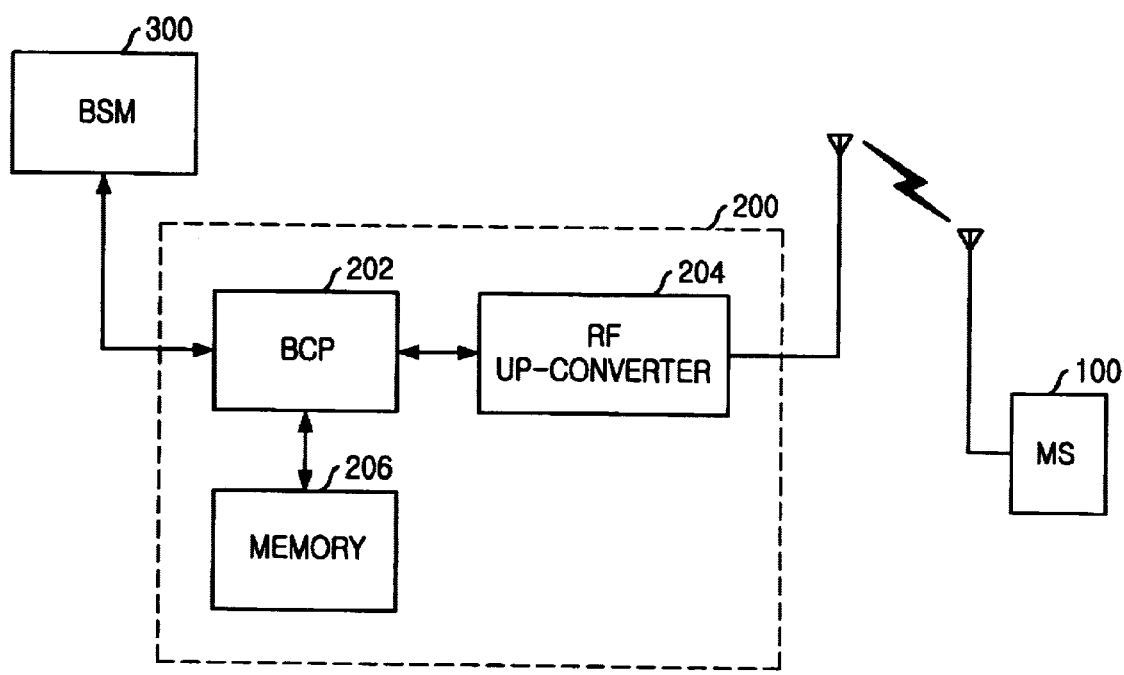
FIG. 2 is a block diagram illustrating a transmission power automatic changing device of a three-sector base station in accordance with the present invention.

FIG. 2 is a block diagram illustrating a transmission power automatic changing device of a three-sector base station in accordance with the present invention.

Referring to FIG. 2, a transmission power automatic changing device within a three-sector base station in accordance with the present invention includes a Base Station Manager (BSM) 300 and a three-sector base station 200 having a Base station Control Processor (BCP) 202, a plurality of RF Up-converters 204 and a memory 206.

The BSM 300 manages a base station controller and multiple base transceiver stations. In order to change the transmission power of the three-sector base station to an optimum transmission power, an operator inputs a transmission attenuation value changing command and a call completion rate threshold value to the BSM 300. Then, the BSM 300 transmits the transmission attenuation value changing command to the BCP 202 in the three-sector base station 200.

Also, when the BCP 202 receives the transmission attenuation value changing command and the call completion rate threshold value, it detects the optimal transmission attenuation values related to the CDMA channels in each sector and setting the values to corresponding RF Up-converters 204, respectively. Then, the BCP stores detected optimal transmission attenuation values in the memory 206 and display them to the operator.

Each of the RF Up-converters 204 of which number is the same as that of the sub-cells included in the three-sector base station 200, controls a transmission power.

The memory 206 stores final transmission attenuation values of the multiple sub-cells in the $\alpha$, $\beta$ and $\gamma$ sector.

Figure 3:
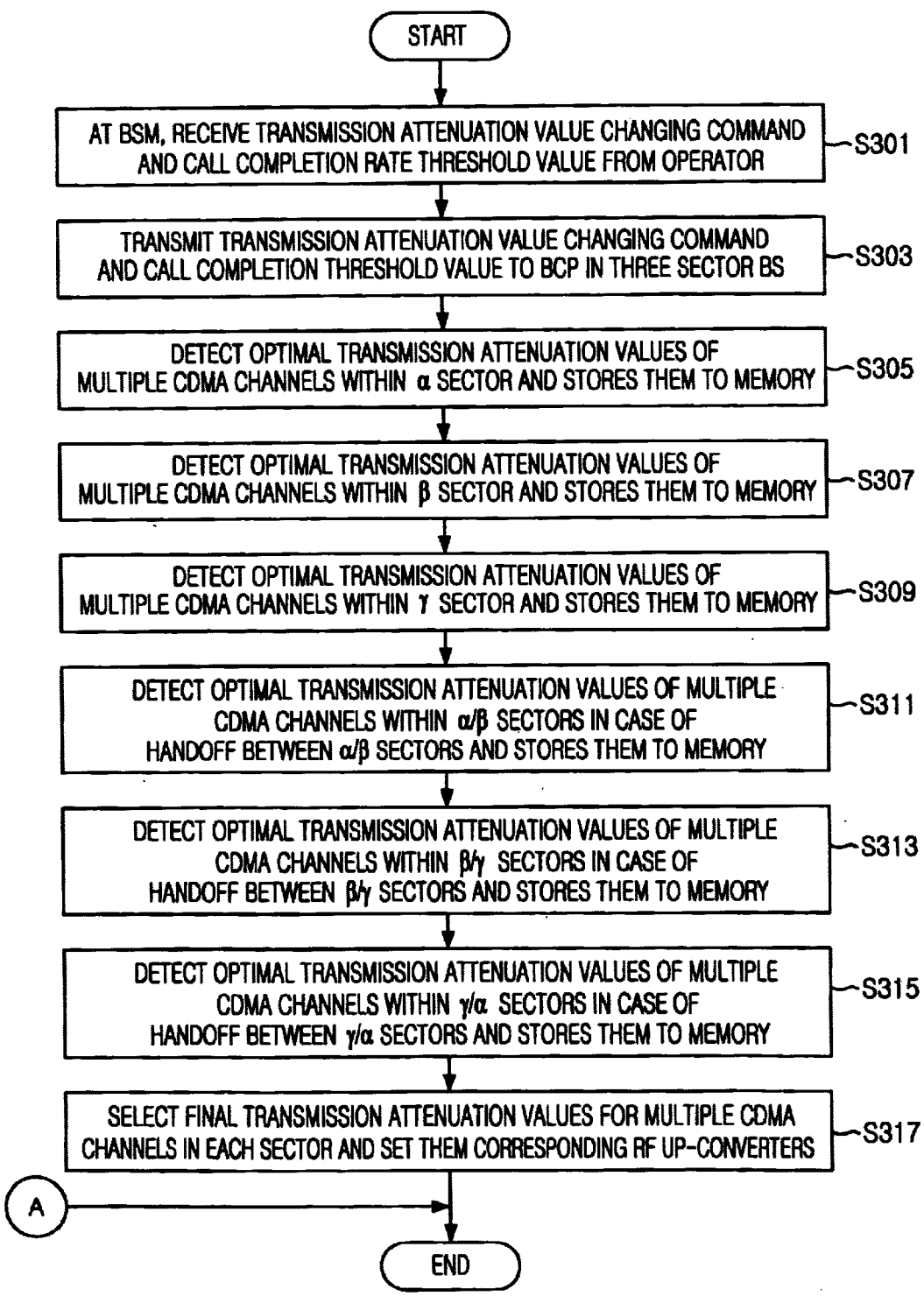
FIG. 3 is a flow chart illustrating an automatic transmission power changing method applied to the three-sector base station in accordance with the present invention.

FIG. 3 is a flow chart illustrating an automatic transmission power changing method applied to the three-sector base station in accordance with the present invention.

First of all, a BSM 300 receives a transmission attenuation value changing command and a call completion rate threshold value from an operator to change the transmission power of the three-sector base station 200 to an optimum transmission power at step S301. Then, the BSM 300 transmits the received data to the BCP 202 in the three-sector base station 200 at step S303.

When the BCP 202 receives the transmission attenuation value changing command and the call completion rate threshold value from the BSM 300, then detects optimal transmission attenuation values of multiple CDMA channels within the $\alpha$ sector and stores them to the memory 206 at step 305.

Figure 4:
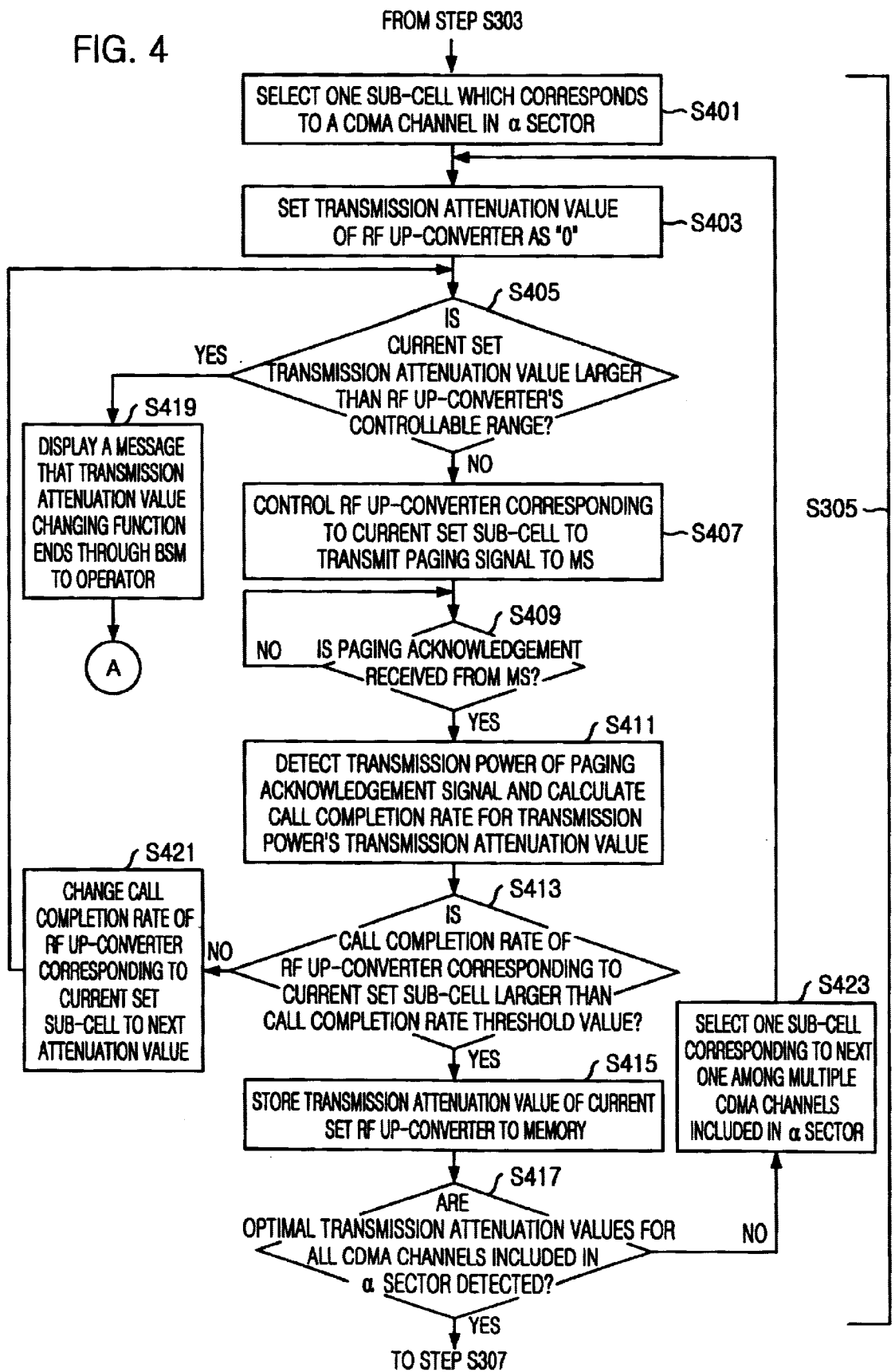
FIG. 4 is a detailed flow chart illustrating a stage of detecting optimal transmission attenuation values of multiple CDMA channels within the $\alpha$ sector in FIG. 3.

Referring to FIG. 4, first of all, the BCP 202 selects one sub-cell which corresponds to a CDMA channel in the $\alpha$ sector at step S401, then the BCP 202 sets the transmission attenuation value of the RF Up-converter 202 as a basic value "0" at step S403.

The BCP 202 determines whether the current set transmission attenuation value is beyond the RF Up-converter's controllable range or not at step S405. For reference, all of the RF Up-converters 202 in the three-sector base station 200 have a controllable range of transmission attenuation value and the transmission attenuation value can be controlled within the range.

If the current set transmission attenuation value of the RF Up-converter does not over the controllable range, the BCP 202 controls the RF Up-converter corresponding to the current set sub-cell and transmits a paging signal to a mobile station 100 at step S407.

Then, the BCP 202 determines whether the paging acknowledgement is received from the mobile station 100 or not at step S409.

If the paging acknowledgement signal is not received, the process goes back to the step S409, and if the paging acknowledgement signal is received, the BCP 202 detects a transmission power of the paging acknowledgement signal and calculate a call completion rate for the transmission power's transmission attenuation value at step S411.

The BCP 202 determines whether the call completion rate threshold value of the RF up-converter 202 corresponding to the current set sub-cell is larger than the call completion rate inputted by the operator or not at step S413.

At this time, if the call completion rate of the RF Up-converter's 202 is larger than the call completion rate threshold value inputted by the operator call, then the BCP 202 stores the transmission attenuation value of the current set RF Up-converter 202 to the memory 206 at step S415.

The BCP 202 determines whether the optimal transmission attenuation values for all CDMA channels included in the $\alpha$ sector are detected or not at step S417. If the detection for all CDMA channels is completed, the process goes to the step S307.

On the other hand, at the step S405, if the transmission attenuation value of the RF Up-converter 202 corresponding to current set sub-cell is larger than the RF Up-converter's 202 controllable transmission attenuation value, then the BCP 202 displays, through BSM 300, a message that the transmission attenuation value changing function ends to the operator and ends the processes.

At the step S413, if the call completion rate of the RF Up-converter 202 corresponding to the current set sub-cell is not larger than the call completion rate threshold value inputted by the operator, the BCP 202 changes the call completion rate of the RF Up-converter 202 corresponding to the current set sub-cell to the next attenuation value at step S421 and proceeds to the step S405.

At the step S417, if the optimal transmission attenuation values for all CDMA channels included in the $\alpha$ sector are not detected, the BCP 202 selects a sub-cell corresponding to the next one among multiple CDMA channels included in the $\alpha$ sector at step S423 and proceed to the step S403.

After the step S305, the BCP 202 detects the optimal transmission attenuation values of multiple CDMA channels included in the $\beta$ sector, then stores them to the memory 206 at step S307.

Figure 5:
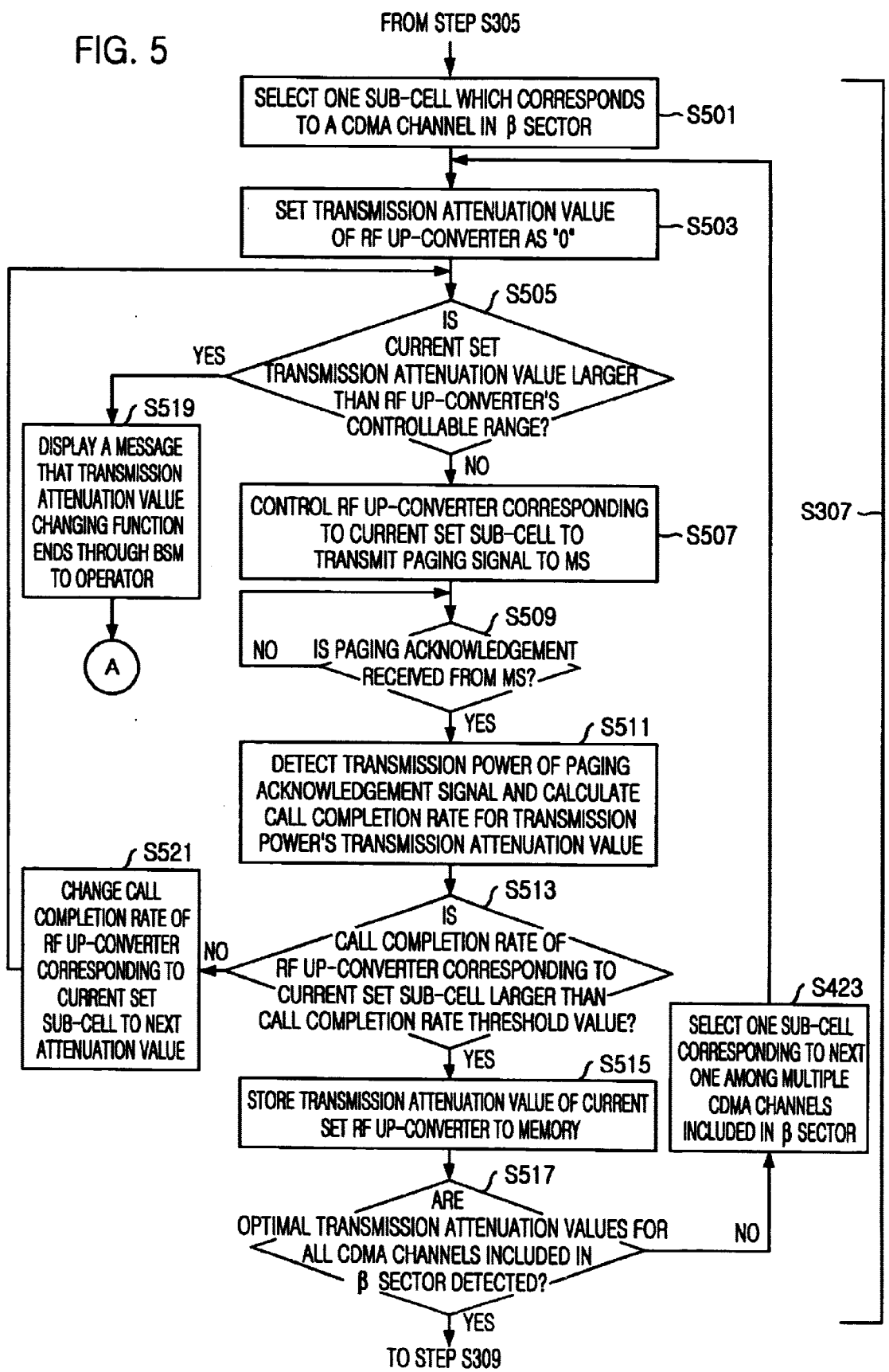
FIG. 5 is a detailed flow chart illustrating a stage of detecting optimal transmission attenuation values of multiple CDMA channels within the $\beta$ sector in FIG. 3.

Referring to FIG. 5, first of all, the BCP 202 selects one sub-cell which corresponds to a CDMA channel in the $\beta$ sector at step S501, then the BCP 202 sets the transmission attenuation value of the RF Up-converter 202 as a basic value "0" at step S503.

The BCP 202 determines whether the current set transmission attenuation value is beyond the RF Up-converter's controllable range or not at step S505.

If the current set transmission attenuation value of the RF Up-converter does not over the controllable range, the BCP 202 controls the RF Up-converter corresponding to the current set sub-cell and transmits a paging signal to a mobile station 100 at step S507.

Then, the BCP 202 determines whether the paging acknowledgement is received from the mobile station 100 or not at step S509.

If the paging acknowledgement signal is not received, the process goes back to the step S509, and if the paging acknowledgement signal is received, the BCP 202 detects a transmission power of the paging acknowledgement signal and calculates a call completion rate for the transmission power's transmission attenuation value at step S511.

The BCP 202 determines whether the call completion rate threshold value of the RF up-converter 202 corresponding to the current set sub-cell is larger than the call completion rate inputted by the operator or not at step S513.

At this time, if the call completion rate of the RF Up-converter's 202 is larger than the call completion rate threshold value inputted by the operator call, then the BCP 202 stores the transmission attenuation value of the current set RF Up-converter 202 to the memory 206 at step S515.

The BCP 202 determines whether the optimal transmission attenuation values for all CDMA channels included in the β sector are detected or not at step S517. If the detection for all CDMA channels is completed, the process goes to the step S309.

On the other hand, at the step S505, if the transmission attenuation value of the RF Up-converter 202 corresponding to current set sub-cell is larger than the RF Up-converter's 202 controllable transmission attenuation value, then the BCP 202 displays, through BSM 300, a message that the transmission attenuation value changing function ends to the operator and ends the processes.

At the step S513, if the call completion rate of the RF Up-converter 202 corresponding to the current set sub-cell is not larger than the call completion rate threshold value inputted by the operator, the BCP 202 changes the call completion rate of the RF Up-converter 202 corresponding to the current set sub-cell to the next attenuation value at step S521 and proceeds to the step S505.

At the step S517, if the optimal transmission attenuation values for all CDMA channels included in the β sector are not detected, the BCP 202 selects a sub-cell corresponding to the next one among multiple CDMA channels included in the β sector at step S523 and proceed to the step S503.

After the step S307, the BCP 202 detects the optimal transmission attenuation values of multiple CDMA channels included in the γ sector, then stores them to the memory 206 at step S309.

Figure 6:
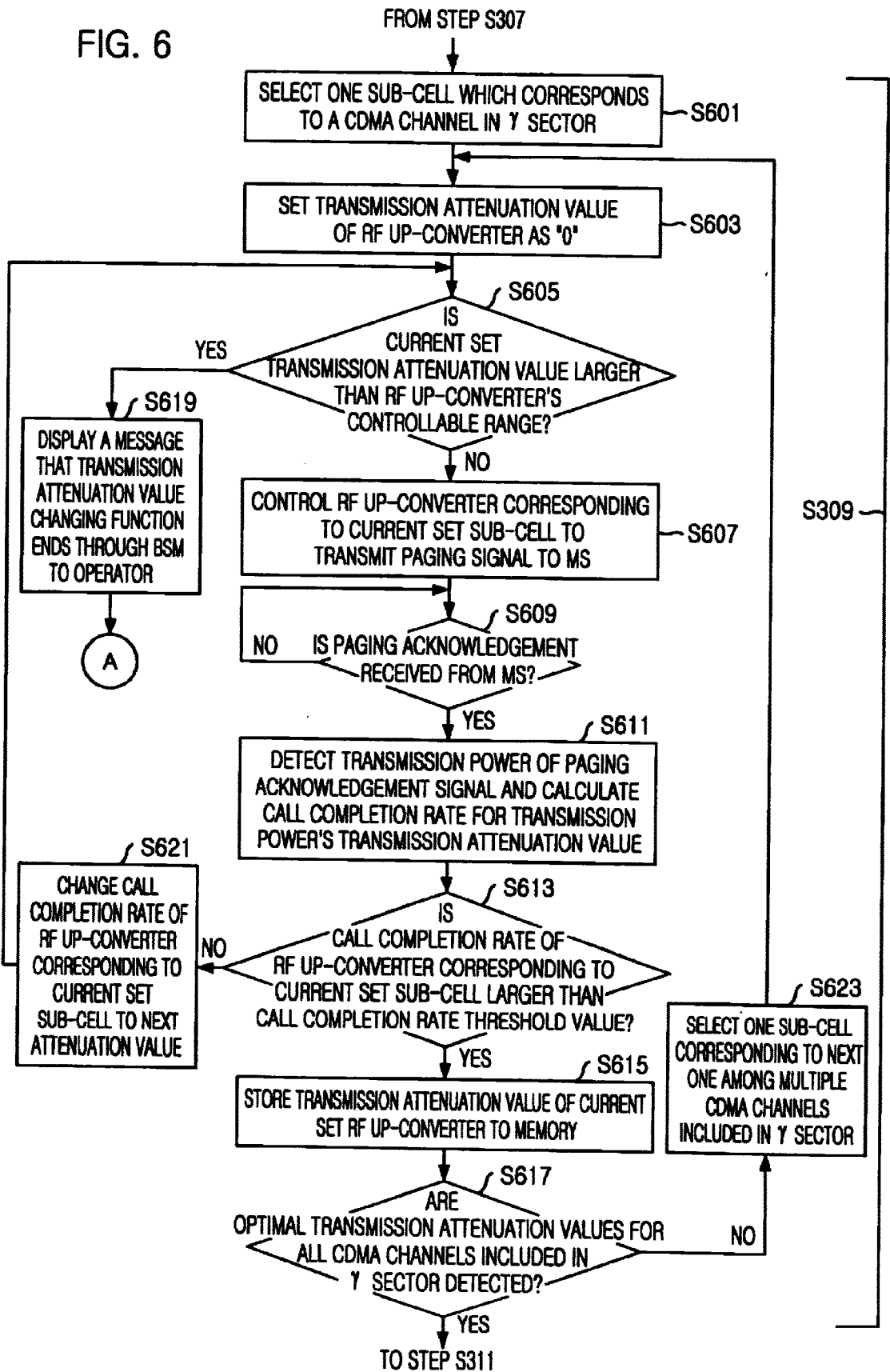
FIG. 6 is a detailed flow chart illustrating a stage of detecting optimal transmission attenuation values of multiple CDMA channels within the $\gamma$ sector in FIG. 3.

Referring to FIG. 6, first of all, the BCP 202 selects one sub-cell which corresponds to a CDMA channel in the γ sector at step S601, then the BCP 202 sets the transmission attenuation value of the RF Up-converter 202 as a basic value "0" at step S603.

The BCP 202 determines whether the current set transmission attenuation value is beyond the RF Up-converter's controllable range or not at step S605.

If the current set transmission attenuation value of the RF Up-converter does not over the controllable range, the BCP 202 controls the RF Up-converter corresponding to the current set sub-cell and transmits a paging signal to a mobile station 100 at step S607.

Then, the BCP 202 determines whether the paging acknowledgement is received from the mobile station 100 or not at step S609.

If the paging acknowledgement signal is not received, the process goes back to the step S609, and if the paging acknowledgement signal is received, the BCP 202 detects a transmission power of the paging acknowledgement signal and calculate a call completion rate for the transmission power's transmission attenuation value at step S611.

The BCP 202 determines whether the call completion rate threshold value of the RF up-converter 202 corresponding to the current set sub-cell is larger than the call completion rate inputted by the operator or not at step S613.

At this time, if the call completion rate of the RF Up-converter's 202 is larger than the call completion rate threshold value inputted by the operator call, then the BCP 202 stores the transmission attenuation value of the current set RF Up-converter 202 to the memory 206 at step S615.

The BCP 202 determines whether the optimal transmission attenuation values for all CDMA channels included in the β sector are detected or not at step S517. If the detection for all CDMA channels is completed, the process goes to the step S311.

On the other hand, at the step S605, if the transmission attenuation value of the RF Up-converter 202 corresponding to current set sub-cell is larger than the RF Up-converter's 202 controllable transmission attenuation value, then the BCP 202 displays, through BSM 300, a message that the transmission attenuation value changing function ends to the operator and ends the processes.

At the step S613, if the call completion rate of the RF Up-converter 202 corresponding to the current set sub-cell is not larger than the call completion rate threshold value inputted by the operator, the BCP 202 changes the call completion rate of the RF Up-converter 202 corresponding to the current set sub-cell to the next attenuation value at step S621 and proceeds to the step S605.

At the step S617, if the optimal transmission attenuation values for all CDMA channels included in the β sector are not detected, the BCP 202 selects a sub-cell corresponding to the next one among multiple CDMA channels included in the β sector at step S623 and proceed to the step S603.

Figure 7:
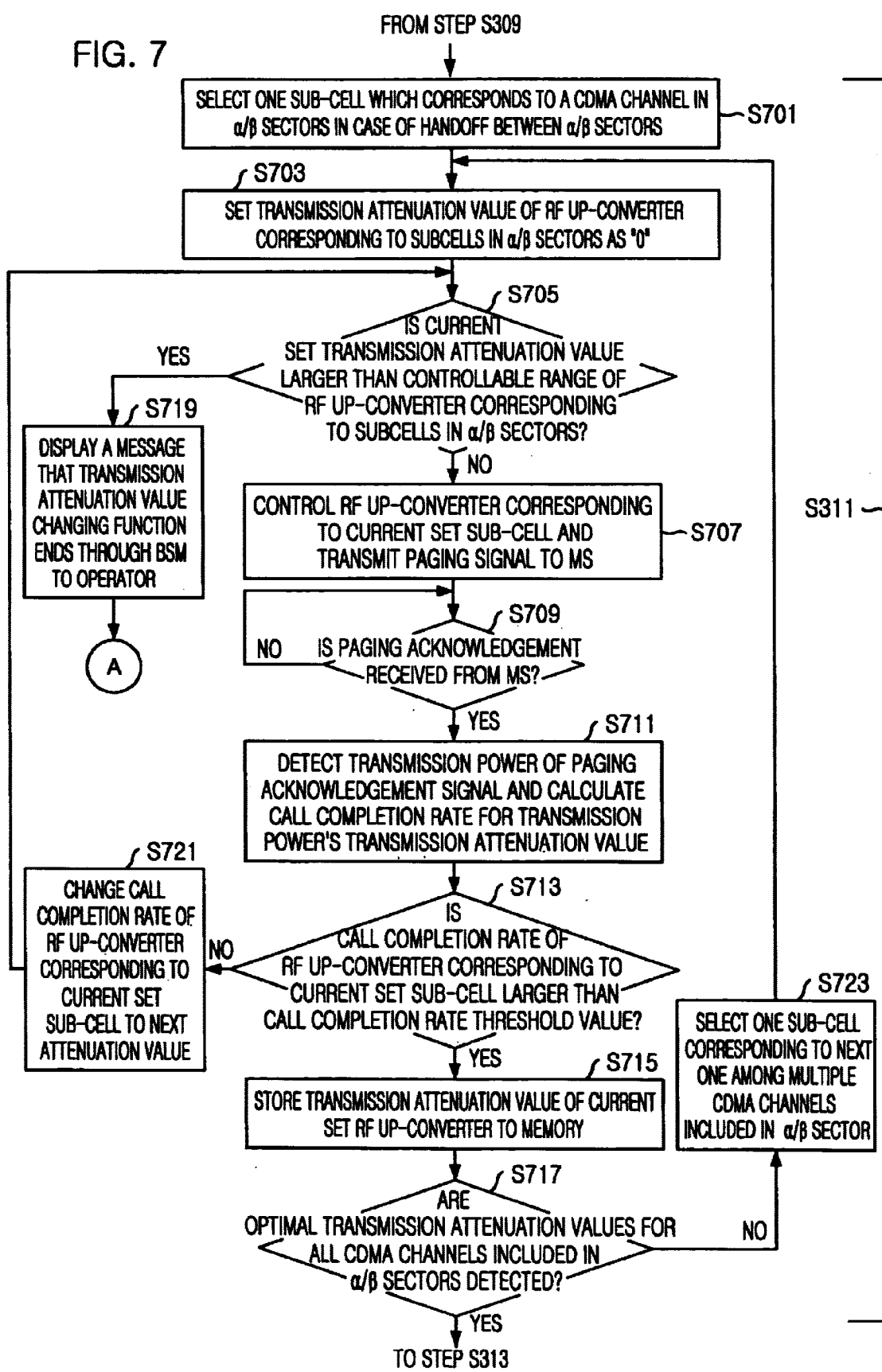
FIG. 7 is a detailed flow chart illustrating a stage of detecting optimal transmission attenuation values of multiple CDMA channels within the $\alpha/\beta$ sector, in case of the $\alpha/\beta$ sector soft hand-off, in FIG. 3.

Referring to FIG. 7, first of all, the BCP 202 selects one sub-cell which corresponds to one of CDMA channels to equally service in the / sectors in case of a soft handoff between and sectors at step S701, then the BCP 202 sets each of the transmission attenuation values of the RF Up-converters 202 corresponding to the CDMA channels in the / sectors as a basic value "0" at step S703.

The BCP 202 determines whether the current set transmission attenuation value corresponding to a sub-cell in the / sectors is larger than the RF Up-converter's controllable range or not at step S705.

If the current set transmission attenuation value of the RF Up-converter is not larger than the controllable range, the BCP 202 controls the RF Up-converter corresponding to the current set sub-cell to transmit a paging signal to a mobile station 100 at step S707.

Then, the BCP 202 determines whether the paging acknowledgement is received from the mobile station 100 or not at step S709.

If the paging acknowledgement signal is not received, the process goes back to the step S709, and if the paging acknowledgement signal is received, the BCP 202 detects a transmission power of the paging acknowledgement signal and calculates a call completion rate for the transmission power's transmission attenuation value at step S711.

The BCP 202 determines whether the call completion rate threshold value of the RF up-converter 202 corresponding to the current set sub-cell is larger than the call completion rate received from by the operator or not at step S713.

At this time, if the call completion rate of the RF Up-converter 202 is larger than the call completion rate threshold value received from the operator, then the BCP 202 stores the transmission attenuation value of the current set RF Up-converter 202 to the memory 206 at step S715.

The BCP 202 determines whether the optimal transmission attenuation values for all CDMA channels included in the α/ sector are detected or not at step S717. If the detection for all CDMA channels is completed, the process goes to the step S313.

On the other hand, at the step S705, if the transmission attenuation value of the RF Up-converter 202 corresponding to the current set sub-cell is larger than the transmission attenuation value range of the RF Up-converter 202, then the BCP 202 displays, through BSM 300, a message that the transmission attenuation value changing function ends to the operator and ends the processes.

At the step S713, if the call completion rate of the RF Up-converter 202 corresponding to the current set sub-cell is not larger than the call completion rate threshold value inputted by the operator, the BCP 202 changes the call completion rate of the RF Up-converter 202 corresponding to the current set sub-cell to a next attenuation value at step S721 and proceeds to the step S705.

At the step S717, if the optimal transmission attenuation values for all CDMA channels for the handoff between the α and the sectors are not detected, the BCP 202 selects a sub-cell corresponding to the next one among multiple CDMA channels included in the α/ sectors at step S723 and proceed to the step S703.

After the step S305, the BCP 202 detects the optimal transmission attenuation values of multiple CDMA channels included in the β/γ sectors in case of a handoff between the β and the γ sectors, then stores them to the memory 206 at step S313.

Figure 8:
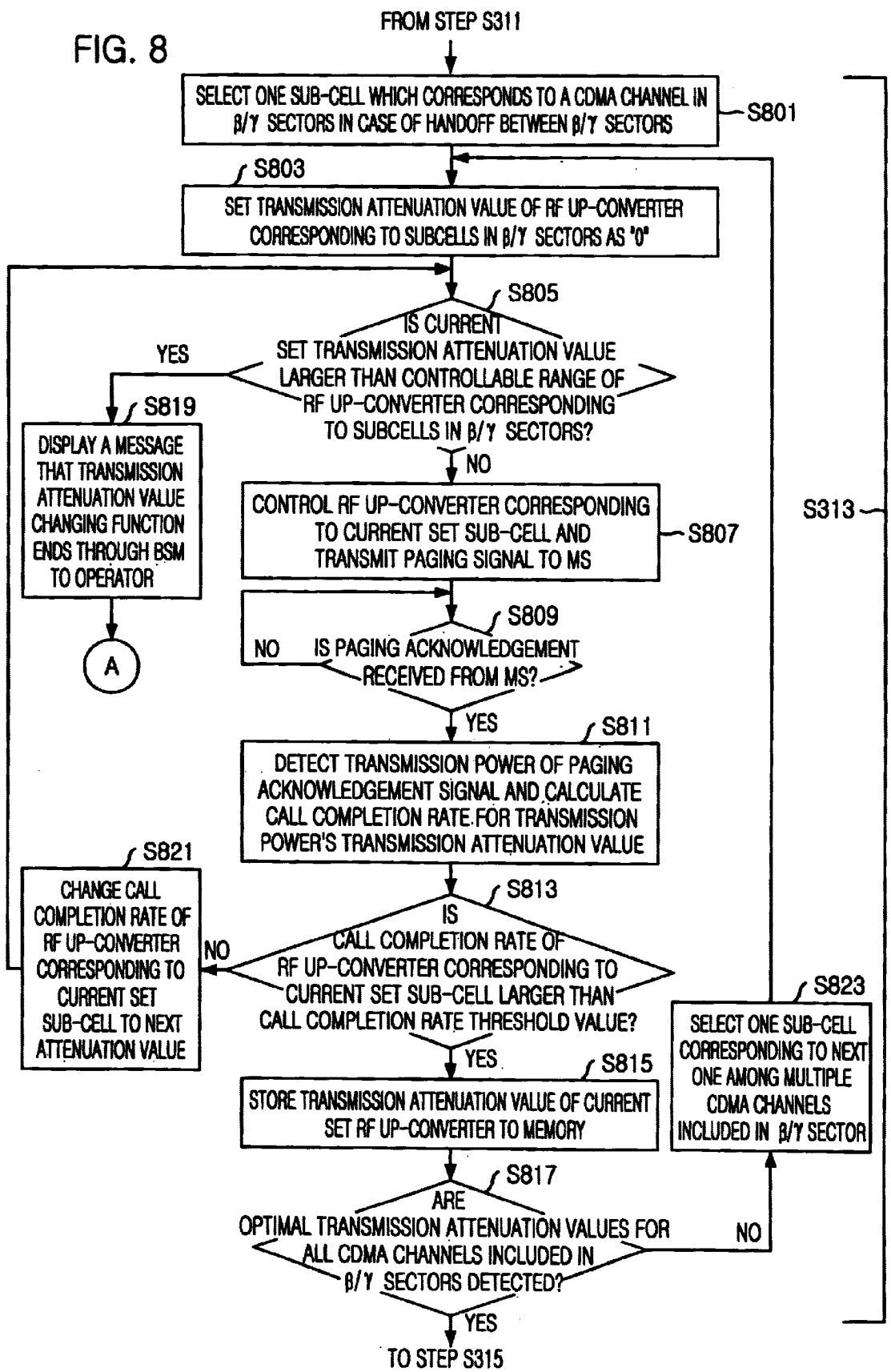
FIG. 8 is a detailed flow chart illustrating a stage of detecting optimal transmission attenuation values of multiple CDMA channels within the $\beta/\gamma$ sector, in case of the $\beta/\gamma$ sector soft hand-off, in FIG. 3.

Referring to FIG. 8, first of all, the BCP 202 selects one sub-cell which corresponds to one of CDMA channels to equally service in the /γ sectors in case of a soft handoff between the and the γ sectors at step S801, then the BCP 202 sets each of the transmission attenuation values of the RF Up-converters 202 corresponding to the CDMA channels in the /γ sectors as a basic value "0" at step S803.

The BCP 202 determines whether the current set transmission attenuation value corresponding to a sub-cell in the /γ sectors is larger than the RF Up-converter's controllable range or not at step S805.

If the current set transmission attenuation value of the RF Up-converter is not larger than the controllable range, the BCP 202 controls the RF Up-converter corresponding to the current set sub-cell to transmit a paging signal to a mobile station 100 at step S807.

Then, the BCP 202 determines whether the paging acknowledgement is received from the mobile station 100 or not at step S809.

If the paging acknowledgement signal is not received, the process goes back to the step S809, and if the paging acknowledgement signal is received, the BCP 202 detects a transmission power of the paging acknowledgement signal and calculates a call completion rate for the transmission power's transmission attenuation value at step S811.

The BCP 202 determines whether the call completion rate threshold value of the RF up-converter 202 corresponding to the current set sub-cell is larger than the call completion rate received from by the operator or not at step S813.

At this time, if the call completion rate of the RF Up-converter 202 is larger than the call completion rate threshold value received from the operator, then the BCP 202 stores the transmission attenuation value of the current set RF Up-converter 202 to the memory 206 at step S815.

The BCP 202 determines whether the optimal transmission attenuation values for all CDMA channels included in the /γ sectors are detected or not at step S817. If the detection for all CDMA channels is completed, the process goes to the step S315.

On the other hand, at the step S805, if the transmission attenuation value of the RF Up-converter 202 corresponding to the current set sub-cell is larger than the transmission attenuation value range of the RF Up-converter 202, then the BCP 202 displays, through BSM 300, a message that the transmission attenuation value changing function ends to the operator and ends the processes.

At the step S813, if the call completion rate of the RF Up-converter 202 corresponding to the current set sub-cell is not larger than the call completion rate threshold value inputted by the operator, the BCP 202 changes the call completion rate of the RF Up-converter 202 corresponding to the current set sub-cell to a next attenuation value at step S821 and proceeds to the step S805.

At the step S817, if the optimal transmission attenuation values for all CDMA channels for the handoff between the and the γ sectors are not detected, the BCP 202 selects a sub-cell corresponding to the next one among multiple CDMA channels included in the /γ sectors at step S823 and proceed to the step S803.

After the step S305, the BCP 202 detects the optimal transmission attenuation values of multiple CDMA channels included in the γ/ sectors in case of a handoff between the γ and the sectors, then stores them to the memory 206 at step S315.

Figure 9:
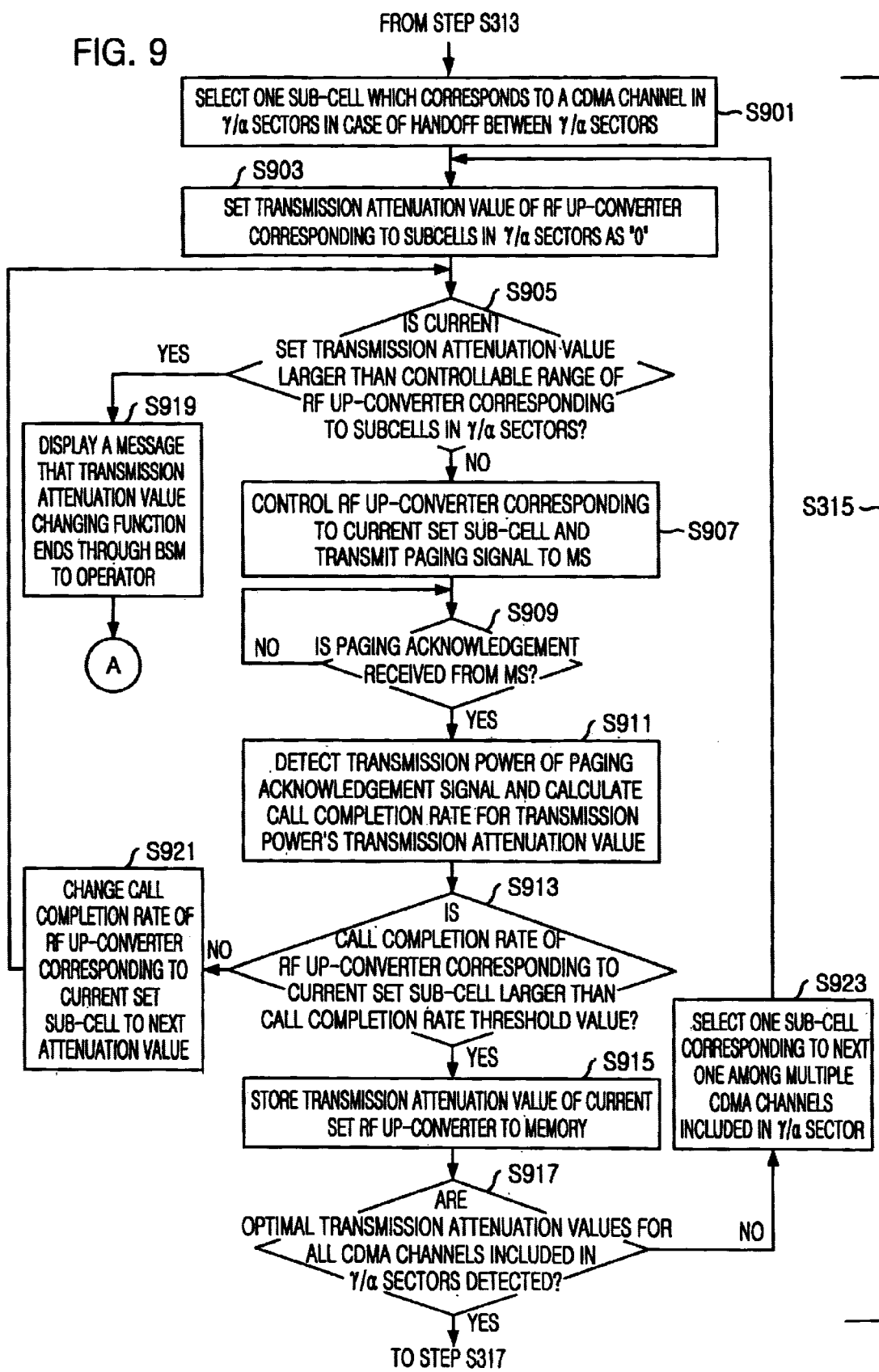
FIG. 9 is a detailed flow chart illustrating a stage of detecting optimal transmission attenuation values of multiple CDMA channels within the $\gamma/\alpha$ sector, in case of the $\gamma/\alpha$ sector soft hand-off, in FIG. 3.

Referring to FIG. 9, first of all, the BCP 202 selects one sub-cell which corresponds to one of CDMA channels to equally service in the γ/ sectors in case of a soft handoff between the γ and the sectors at step S901, then the BCP 202 sets each of the transmission attenuation values of the RF Up-converters 202 corresponding to the CDMA channels in the /γ sectors as a basic value "0" at step S903.

The BCP 202 determines whether the current set transmission attenuation value corresponding to a sub-cell in the γ/ sectors is larger than the RF Up-converter's controllable range or not at step S905.

If the current set transmission attenuation value of the RF Up-converter is not larger than the controllable range, the BCP 202 controls the RF Up-converter corresponding to the current set sub-cell to transmit a paging signal to a mobile station 100 at step S907.

Then, the BCP 202 determines whether the paging acknowledgement is received from the mobile station 100 or not at step S909.

If the paging acknowledgement signal is not received, the process goes back to the step S909, and if the paging acknowledgement signal is received, the BCP 202 detects a transmission power of the paging acknowledgement signal and calculates a call completion rate for the transmission power's transmission attenuation value at step S911.

The BCP 202 determines whether the call completion rate threshold value of the RF up-converter 202 corresponding to the current set sub-cell is larger than the call completion rate received from by the operator or not at step S913.

At this time, if the call completion rate of the RF Up-converter 202 is larger than the call completion rate threshold value received from the operator, then the BCP 202 stores the transmission attenuation value of the current set RF Up-converter 202 to the memory 206 at step S915.

The BCP 202 determines whether the optimal transmission attenuation values for all CDMA channels included in the γ/ sectors are detected or not at step S917. If the detection for all CDMA channels is completed, the process goes to the step S317.

On the other hand, at the step S905, if the transmission attenuation value of the RF Up-converter 202 corresponding to the current set sub-cell is larger than the transmission attenuation value range of the RF Up-converter 202, then the BCP 202 displays, through BSM 300, a message that the transmission attenuation value changing function ends to the operator and ends the processes.

At the step S913, if the call completion rate of the RF Up-converter 202 corresponding to the current set sub-cell is not larger than the call completion rate threshold value inputted by the operator, the BCP 202 changes the call completion rate of the RF Up-converter 202 corresponding to the current set sub-cell to a next attenuation value at step S921 and proceeds to the step S905.

At the step S917, if the optimal transmission attenuation values for all CDMA channels for the handoff between the γ and the sectors are not detected, the BCP 202 selects a sub-cell corresponding to the next one among multiple CDMA channels included in the γ/ sectors at step S923 and proceed to the step S903.

The BCP 202 compares the optimal transmission attenuation values stored in the memory 206 with those for the CDMA channels in , and γ sectors, thereby selecting final transmission attenuation values for the CDMA channels in each sector and setting the RF up-converts as the final transmission attenuation values at step S317.

Figure 10:
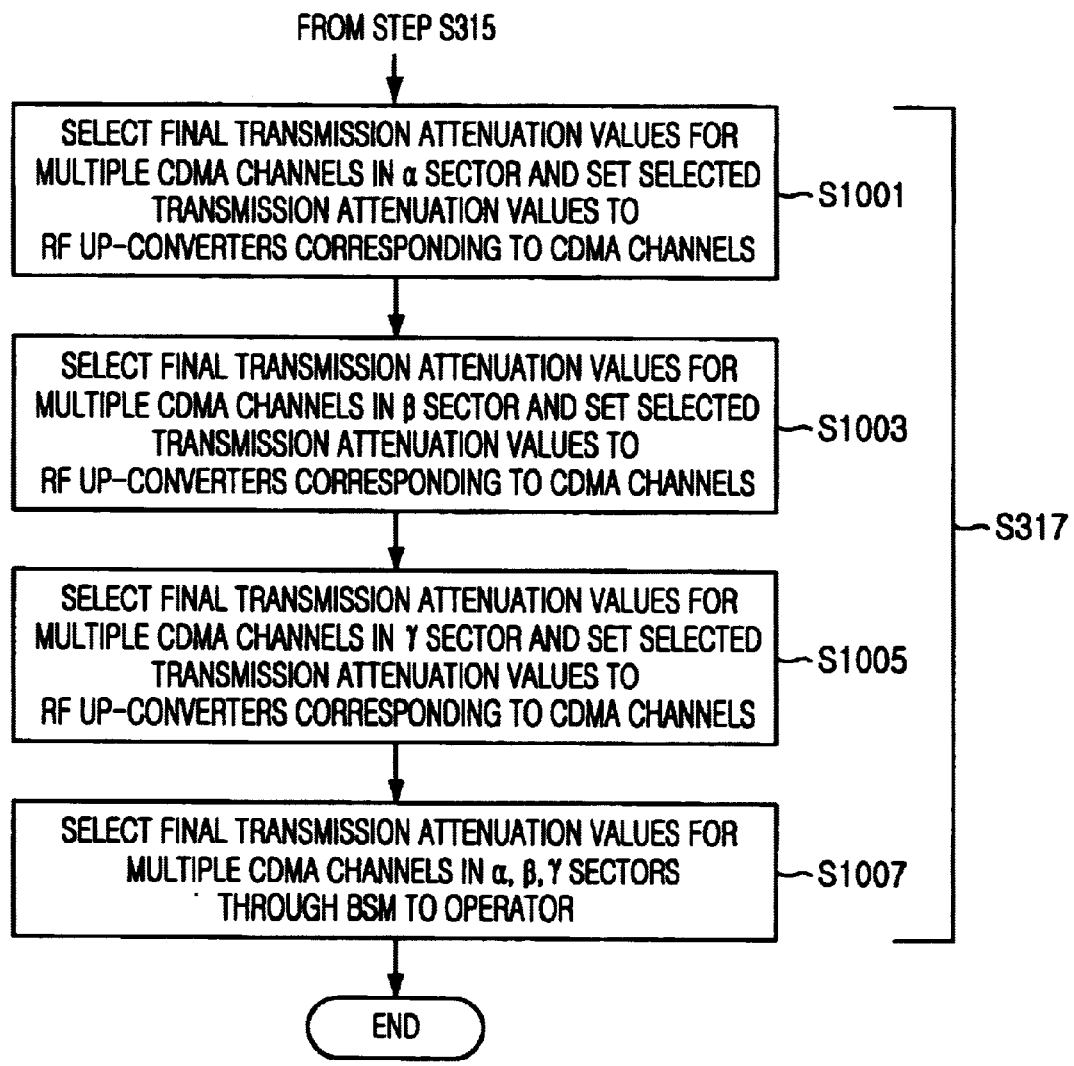
FIG. 10 is a detailed flow chart illustrating a stage of selecting transmission attenuation values of multiple CDMA channels in each $\alpha$, $\beta$ and $\gamma$ sector in FIG. 3.

Referring to FIG. 10, the BCP 202 reads from the memory 206 and compares optimal transmission attenuation values for the multiple CDMA channels in the α sector and optimal transmission attenuation values for the multiple CDMA channels in the α sector in case of handoffs between the α/β sectors and between the γ/α sectors, thereby selecting a final transmission attenuation values for the CDMA channels in the α sector setting each of the final transmission attenuation values to the corresponding RF Up-converter 204 at step S1001.

Detailed operations of the step S1001 are described with reference to FIG. 11.

Figure 11:
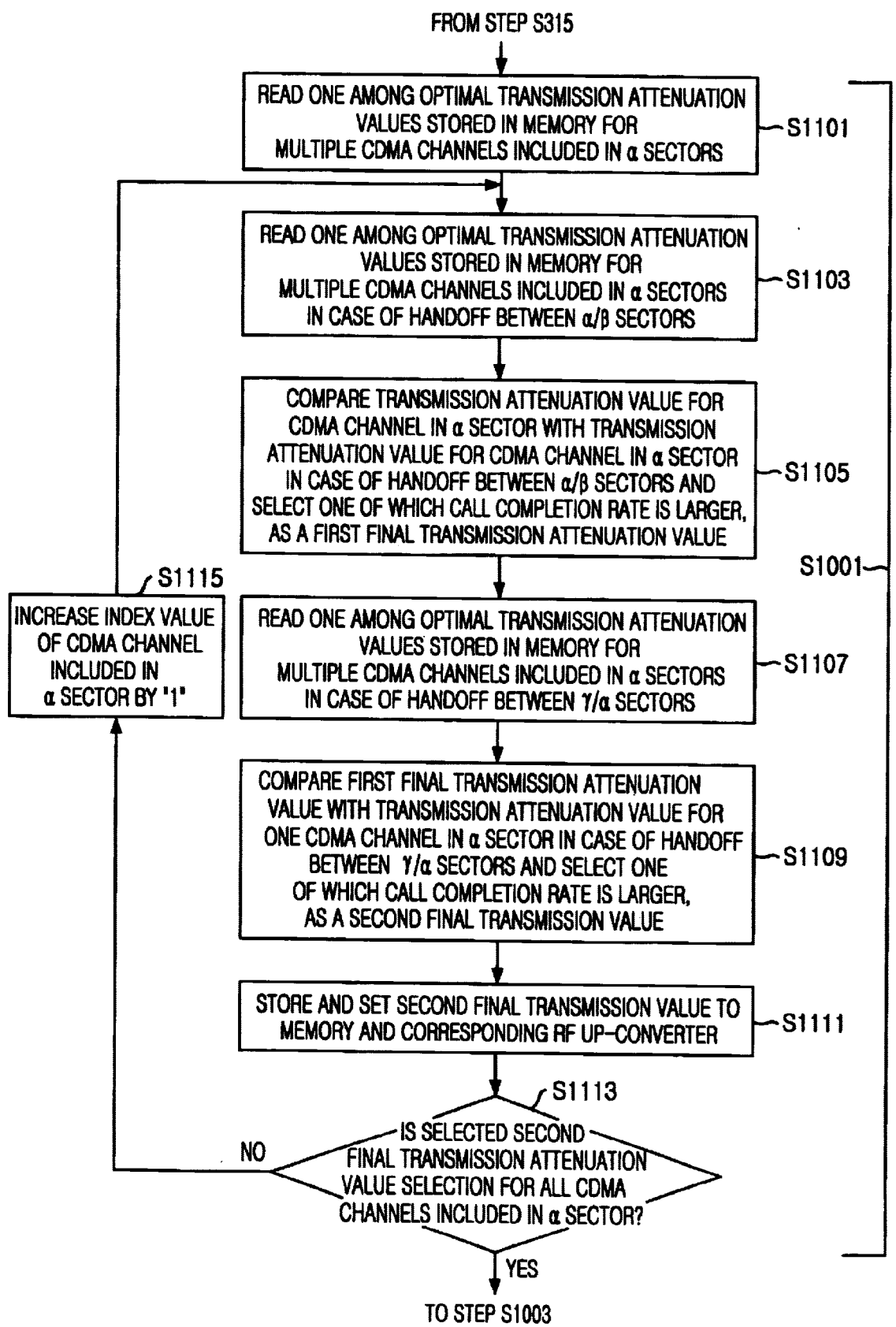
FIG. 11 is a detailed flow chart illustrating a stage of selecting transmission attenuation values of multiple CDMA channels in $\alpha$ sector.

Referring to FIG. 11, first of all, the BCP 202 reads an optimal transmission attenuation value corresponding to a CDMA channel in the sector at step 1101.

In case of the handoff between the α and the β sectors, the BCP 202 reads from the memory 206 the optimal transmission attenuation value corresponding to a CDMA channel in the sector at step 1103.

The BCP 202 compares the optimal transmission attenuation value with the optimal transmission attenuation value in case of the handoff between the α and the β sectors, thereby selecting one of which the call completion rate is better than that of the other, as a first final transmission attenuation value at step S1105.

In case of the handoff between the γ and the sectors, the BCP 202 reads from the memory 206 the optimal transmission attenuation value corresponding to a CDMA channel in the sector at step 1107.

The BCP 202 compares the optimal transmission attenuation value with the optimal transmission attenuation value in case of the handoff between the β and the γ sectors, thereby selecting one of which the call completion rate is better than that of the other, as a second final transmission attenuation value at step S1109.

The BCP 202 stores the second final transmission attenuation value for the CDMA channel in the α sector into memory 206 and sets the second final transmission attenuation value to the corresponding RF up-converter 204 at step S1111.

The BCP 202, at step 1113, determines whether selection of the second final transmission attenuation value for every CDMA channel in the α sector is completed or not. If the selection is completed, the process continues to step 1003.

On the other hand, if the selection is not completed at step 1113, at step 1115, the BCP 202 adds "1" to an index value of CDMA channel included in the α sector, and then the process goes back to the step 1103.

After the step 1001, the BCP 202 reads from the memory 206 and compares optimal transmission attenuation values for the multiple CDMA channels in the β sector and optimal transmission attenuation values for the multiple CDMA channels in the β sector in case of handoffs between the α/β sectors and between the β/γ sectors, thereby selecting a final transmission attenuation values for the CDMA channels in the α sector setting each of the final transmission attenuation values to the corresponding RF Up-converter 204 at step S1003.

Detailed operations of the step S1003 are described with reference to FIG. 12.

Figure 12:
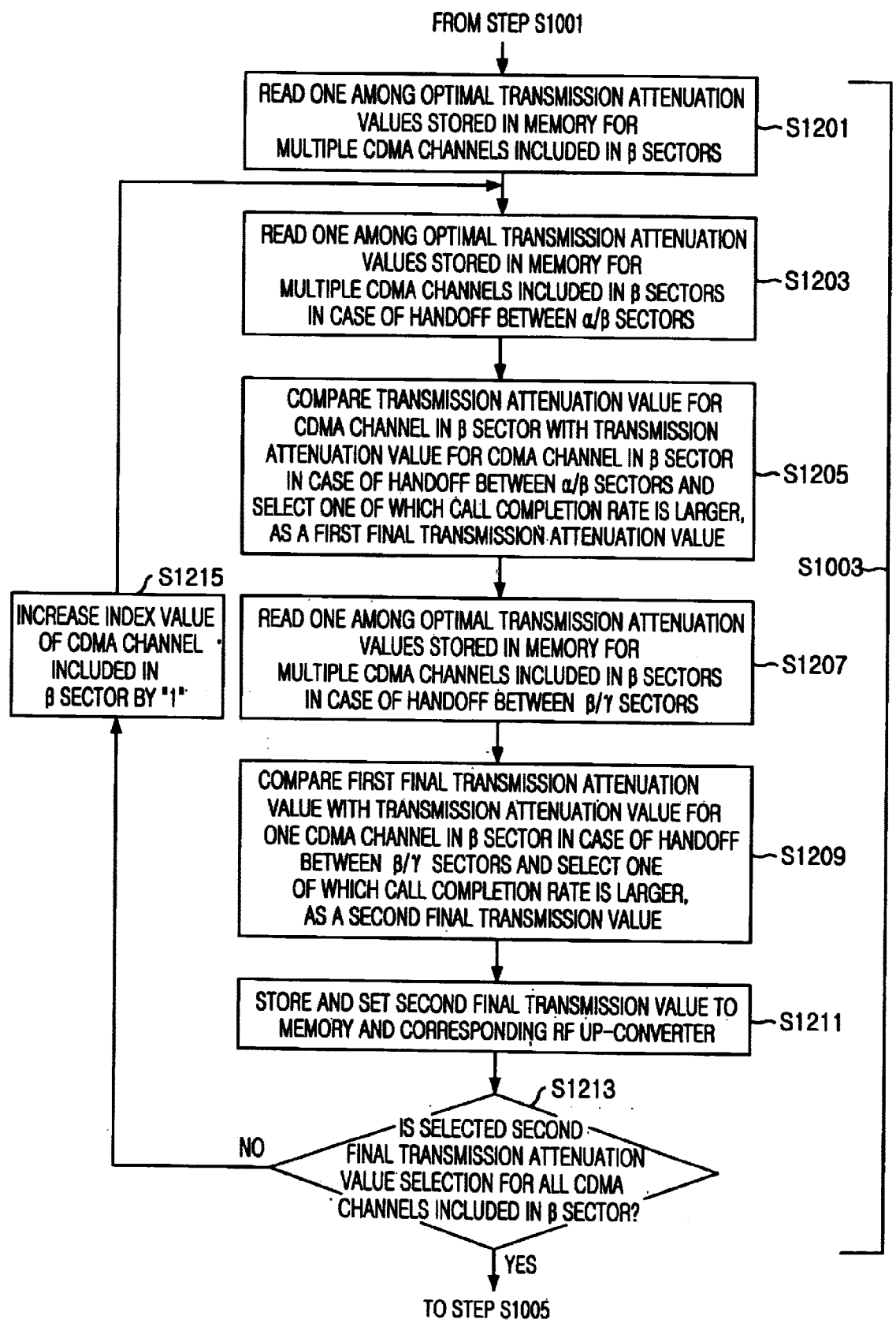
FIG. 12 is a detailed flow chart illustrating a stage of selecting transmission attenuation values of multiple CDMA channels in $\beta$ sector.

Referring to FIG. 12, first of all, the BCP 202 reads an optimal transmission attenuation value corresponding to a CDMA channel in the β sector at step 1201.

In case of the handoff between the α and the β sectors, the BCP 202 reads from the memory 206 the optimal transmission attenuation value corresponding to a CDMA channel in the β sector at step 1203.

The BCP 202 compares the optimal transmission attenuation value with the optimal transmission attenuation value in case of the handoff between the α and the β sectors, thereby selecting one of which the call completion rate is better than that of the other, as a first final transmission attenuation value at step S1205.

In case of the handoff between the β and the γ sectors, the BCP 202 reads from the memory 206 the optimal transmission attenuation value corresponding to a CDMA channel in the β sector at step 1207.

The BCP 202 compares the optimal transmission attenuation value with the optimal transmission attenuation value in case of the handoff between the β and the γ sectors, thereby selecting one of which the call completion rate is better than that of the other, as a second final transmission attenuation value at step S1209.

The BCP 202 stores the second final transmission attenuation value for the CDMA channel in the β sector into memory 206 and sets the second final transmission attenuation value to the corresponding RF up-converter 204 at step S1211.

The BCP 202, at step 1213, determines whether selection of the second final transmission attenuation value for every CDMA channel in the β sector is completed or not. If the selection is completed, the process continues to step 1005.

On the other hand, if the selection is not completed at step 1213, at step 1215, the BCP 202 adds "1" to an index value of CDMA channel included in the sector, and then the process goes back to the step 1203.

After the step 1003, the BCP 202 reads from the memory 206 and compares optimal transmission attenuation values for the multiple CDMA channels in the γ sector and optimal transmission attenuation values for the multiple CDMA channels in the γ sector in case of handoffs between the β/γ sectors and between the γ/ sectors, thereby selecting a final transmission attenuation values for the CDMA channels in the γ sector setting each of the final transmission attenuation values to the corresponding RF Up-converter 204 at step S1005.

Detailed operations of the step S1005 are described with reference to FIG. 13.

Figure 13:
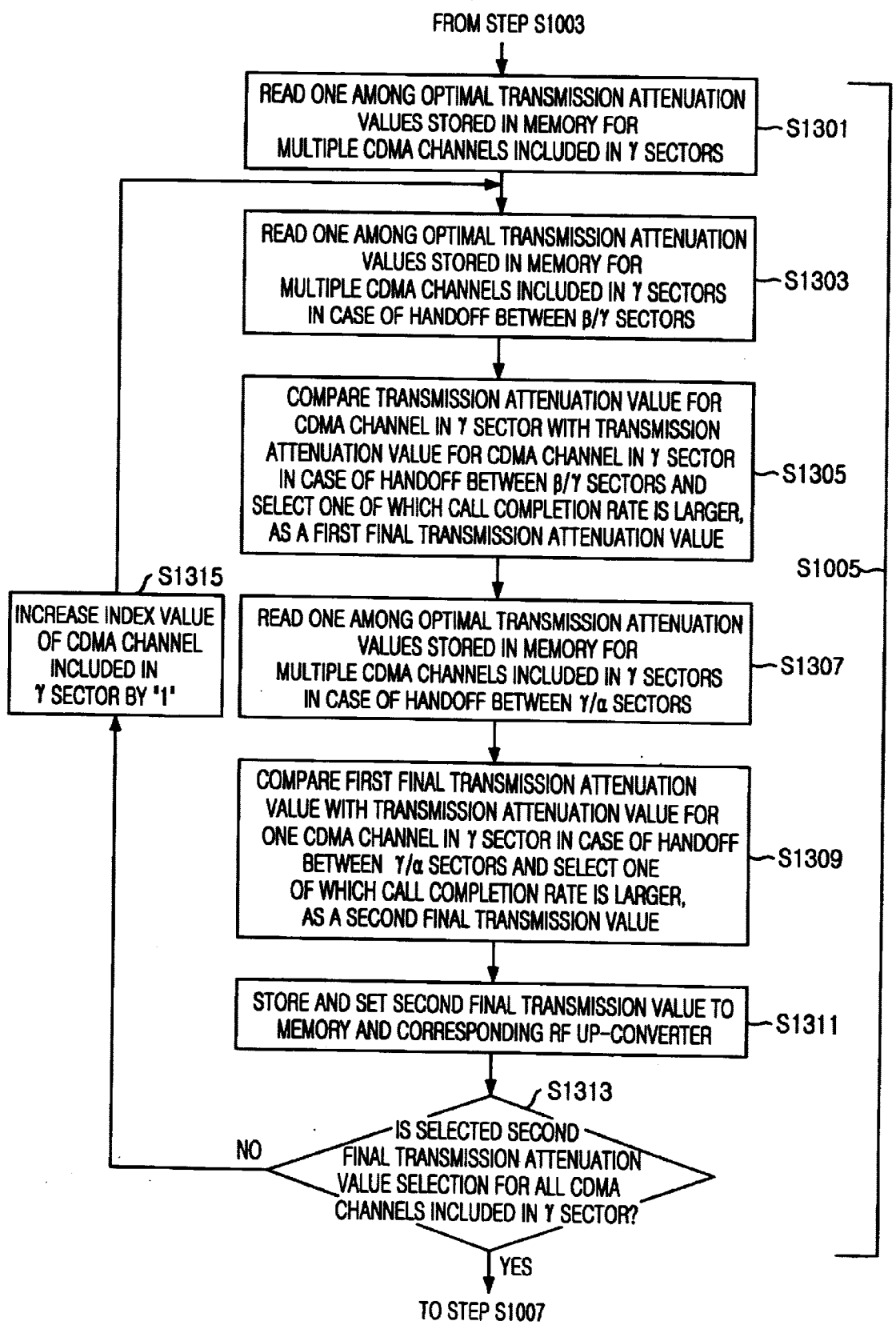
FIG. 13 is a detailed flow chart illustrating a stage of selecting transmission attenuation values of multiple CDMA channels in $\gamma$ sector.

Referring to FIG. 13, first of all, the BCP 202 reads an optimal transmission attenuation value corresponding to a CDMA channel in the γ sector at step 1301.

In case of the handoff between the β and the γ sectors, the BCP 202 reads from the memory 206 the optimal transmission attenuation value corresponding to a CDMA channel in the γ sector at step 1303.

The BCP 202 compares the optimal transmission attenuation value with the optimal transmission attenuation value in case of the handoff between the β and the γ sectors, thereby selecting one of which the call completion rate is better than that of the other, as a first final transmission attenuation value at step S1305.

In case of the handoff between the γ and the sectors, the BCP 202 reads from the memory 206 the optimal transmission attenuation value corresponding to a CDMA channel in the γ sector at step 1307.

The BCP 202 compares the optimal transmission attenuation value with the optimal transmission attenuation value in case of the handoff between the γ and the sectors, thereby selecting one of which the call completion rate is better than that of the other, as a second final transmission attenuation value at step S1309.

The BCP 202 stores the second final transmission attenuation value for the CDMA channel in the γ sector into memory 206 and sets the second final transmission attenuation value to the corresponding RF up-converter 204 at step S1311.

The BCP 202, at step 1313, determines whether selection of the second final transmission attenuation value for every CDMA channel in the γ sector is completed or not. If the selection is completed, the process continues to step 1007.

On the other hand, if the selection is not completed at step 1313, at step 1315, the BCP 202 adds "1" to an index value of CDMA channel included in the γ sector, and then the process goes back to the step 1303.

The BCP 202 displays the final transmission attenuation values for the multiple CDMA channels serviced in α, β and γ sectors, which are stored in the memory 206, and operation results through the BSM 300 at step S1007.

In this embodiment, only a method for automatically changing the transmission power of three-sector base station is described. However, the transmission power of not only an omni-sector base station and a two-sector base station but also of a multiple-sector base station, can be automatically changed based on the method as described above.

In the method for automatically changing the transmission power of three-sector base station in accordance with the present invention, the optimal transmission attenuation values for multiple CDMA channels in each sector are detected at the three-sector base station and set to the corresponding RF Up-converters. Therefore, the detection and setting of the optimal transmission attenuation values for multiple CDMA channels are simply performed, thereby reducing time and cost for the detection and setting. Also, in the present invention, the cell-plan device is not necessary, which reduces expense to detect the optimal transmission attenuation values.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for automatically changing transmission power of a three-sector base station in a mobile communication system, wherein the mobile communication system includes a base station manager (BSM) and a base station having a base station control processor (BCP), a plurality of RF Up-converters and a memory, the method comprising the steps of:

a) receiving a transmission attenuation value change command and a call completion rate threshold value;

b) transmitting the transmission attenuation value change command and the call completion rate threshold value to the BCP;

c) detecting optimal transmission attenuation values for CDMA channels in an α sector and storing the optimal transmission attenuation values into the memory;

d) detecting optimal transmission attenuation values for CDMA channels in a β sector and storing the optimal transmission attenuation values into the memory;

e) detecting optimal transmission attenuation values for CDMA channels in a γ sector and storing the optimal transmission attenuation values into the memory;

f) detecting optimal transmission attenuation values for multiple CDMA channels in the α sector in case of a handoff between the α and the β sectors and storing the optimal transmission attenuation values into the memory;

g) detecting optimal transmission attenuation values for multiple CDMA channels in the α sector in case of a handoff between the β and the γ sectors and storing the optimal transmission attenuation values into the memory;

h) detecting optimal transmission attenuation values for multiple CDMA channels in the α sector in case of a handoff between the γ and the α sectors and storing the optimal transmission attenuation values into the memory; and i) selecting final optimal transmission attenuation values for the multiple channels in each of the sectors and setting each the final optimal transmission attenuation value to corresponding RF up-converter.

2. The method as recited in claim 1, wherein the step c) includes the steps of:

c-1) selecting a sub-cell corresponding to a CDMA channel in the α sector;

c-2) setting a transmission attenuation value of the RF Up-converter corresponding to the sub-cell as a basic value "0";

c-3) determining whether the transmission attenuation value is larger than that in controllable range of the RF Up-converter or not;

c-4) if the transmission attenuation value is not larger than that in controllable range of the RF Up-converter, controlling the RF Up-converter to transmit a paging signal to a mobile station;

c-5) determining whether a paging acknowledgement signal is received from the mobile station or not;

c-6) if paging acknowledgement signal is received, detecting a transmission power of the paging acknowledgement signal and calculating a call completion rate of the transmission power to a transmission attenuation value;

c-7) determining whether the call completion rate of the RF Up-converter is larger than the call completion rate threshold value or not;

c-8) if the call completion rate of the RF Up-converter is larger than the call completion rate threshold value, storing the transmission attenuation value set to the RF Up-converter into the memory; and c-9) determining whether detection of the optimal transmission attenuation value for every CDMA channel included in the α sector is completed or not; and c-10) if the detection is completed, proceeding to the step d).

3. The method as recited in claim 2, further including the step of: c-11) if the transmission attenuation value is not larger than that in controllable range of the RF Up-converter at the step c-3), displaying a message that a transmission attenuation value changing function ends.

4. The method as recited in claim 2, further including the step of: c-12) if the call completion rate of the RF Up-converter is larger than the call completion rate threshold value at the step c-7), adjusting the transmission attenuation value to a next transmission attenuation value and proceeding to the step c-3).

5. The method as recited in claim 2, further including the step of: c-13) if the detection is not completed, selecting another sub-cell corresponding to a next CDMA channel in the α sector and going back to the step c-2).

6. The method as recited in claim 1, wherein the step d) includes the steps of:

d-1) selecting a sub-cell corresponding to a CDMA channel in the β sector;

d-2) setting a transmission attenuation value of the RF Up-converter corresponding to the sub-cell as a basic value "0";

d-3) determining whether the transmission attenuation value is larger than that in controllable range of the RF Up-converter or not;

d-4) if the transmission attenuation value is not larger than that in controllable range of the RF Up-converter, controlling the RF Up-converter to transmit a paging signal to a mobile station;

d-5) determining whether a paging acknowledgement signal is received from the mobile station or not;

d-6) if paging acknowledgement signal is received, detecting a transmission power of the paging acknowledgement signal and calculating a call completion rate of the transmission power to a transmission attenuation value;

d-7) determining whether the call completion rate of the RF Up-converter is larger than the call completion rate threshold value or not;

d-8) if the call completion rate of the RF Up-converter is larger than the call completion rate threshold value, storing the transmission attenuation value set to the RF Up-converter into the memory; and d-9) determining whether detection of the optimal transmission attenuation value for every CDMA channel included in the β sector is completed or not; and d-10) if the detection is completed, proceeding to the step e).

7. The method as recited in claim 6, further including the step of: d-11) if the transmission attenuation value is not larger than that in controllable range of the RF Up-converter at the step d-3), displaying a message that a transmission attenuation value changing function ends.

8. The method as recited in claim 6, further including the step of: d-12) if the call completion rate of the RF Up-converter is larger than the call completion rate threshold value at the step d-7), adjusting the transmission attenuation value to a next transmission attenuation value and proceeding to the step d-3).

9. The method as recited in claim 6, further including the step of: d-13) if the detection is not completed, selecting another sub-cell corresponding to a next CDMA channel in the β sector and going back to the step d-2).

10. The method as recited in claim 1, wherein the step e) includes the steps of:

e-1) selecting a sub-cell corresponding to a CDMA channel in the γ sector;

e-2) setting a transmission attenuation value of the RF Up-converter corresponding to the sub-cell as a basic value "0";

e-3) determining whether the transmission attenuation value is larger than that in controllable range of the RF Up-converter or not;

e-4) if the transmission attenuation value is not larger than that in controllable range of the RF Up-converter, controlling the RF Up-converter to transmit a paging signal to a mobile station;

e-5) determining whether a paging acknowledgement signal is received from the mobile station or not;

e-6) if paging acknowledgement signal is received, detecting a transmission power of the paging acknowledgement signal and calculating a call completion rate of the transmission power to a transmission attenuation value;

e-7) determining whether the call completion rate of the RF Up-converter is larger than the call completion rate threshold value or not;

e-8) if the call completion rate of the RF Up-converter is larger than the call completion rate threshold value, storing the transmission attenuation value set to the RF Up-converter into the memory; and e-9) determining whether detection of the optimal transmission attenuation value for every CDMA channel included in the γ sector is completed or not; and e-10) if the detection is completed, proceeding to the step e).

11. The method as recited in claim 10, further including the step of: e-11) if the transmission attenuation value is not larger than that in controllable range of the RF Up-converter at the step e-3), displaying a message that a transmission attenuation value changing function ends.

12. The method as recited in claim 10, further including the step of: e-12) if the call completion rate of the RF Up-converter is larger than the call completion rate threshold value at the step e-7), adjusting the transmission attenuation value to a next transmission attenuation value and proceeding to the step d-3).

13. The method as recited in claim 10, further including the step of: e-13) if the detection is not completed, selecting another sub-cell corresponding to a next CDMA channel in the γ sector and going back to the step e-2).

14. The method as recited in claim 1, wherein the step f) includes the steps of:

f-1) selecting a sub-cell corresponding to a CDMA channel in the α and the β sectors in case of a handoff between the α and the β sectors;

f-2) setting a transmission attenuation value of the RF Up-converter corresponding to the sub-cell as a basic value "0";

f-3) determining whether the transmission attenuation value is larger than that in controllable range of the RF Up-converter or not;

f-4) if the transmission attenuation value is not larger than that in controllable range of the RF Up-converter, controlling the RF Up-converter to transmit a paging signal to a mobile station;

f-5) determining whether a paging acknowledgement signal is received from the mobile station or not;

f-6) if paging acknowledgement signal is received, detecting a transmission power of the paging acknowledgement signal and calculating a call completion rate of the transmission power to a transmission attenuation value;

f-7) determining whether the call completion rate of the RF Up-converter is larger than the call completion rate threshold value or not;

f-8) if the call completion rate of the RF Up-converter is larger than the call completion rate threshold value, storing the transmission attenuation value set to the RF Up-converter into the memory; and f-9) determining whether detection of the optimal transmission attenuation value for every CDMA channel necessary for the handoff between the $\alpha$ and the $\beta$ sectors is completed or not; and f-10) if the detection is completed, proceeding to the step g).

15. The method as recited in claim 14, further including the step of: f-11) if the transmission attenuation value is not larger than that in controllable range of the RF Up-converter at the step f-3), displaying a message that a transmission attenuation value changing function ends.

16. The method as recited in claim 14, further including the step of: f-12) if the call completion rate of the RF Up-converter is larger than the call completion rate threshold value at the step f-7), adjusting the transmission attenuation value to a next transmission attenuation value and proceeding to the step f-3).

17. The method as recited in claim 14, further including the step of: f-13) if the detection is not completed, selecting another sub-cell corresponding to a next CDMA channel in the $\alpha$ and the $\beta$ sectors and going back to the step f-2).

18. The method as recited in claim 1, wherein the step g) includes the steps of:

g-1) selecting a sub-cell corresponding to a CDMA channel in the $\beta$ and the $\gamma$ sectors in case of a handoff between the $\beta$ and the $\gamma$ sectors;

g-2) setting a transmission attenuation value of the RF Up-converter corresponding to the sub-cell as a basic value "0";

g-3) determining whether the transmission attenuation value is larger than that in controllable range of the RF Up-converter or not;

g-4) if the transmission attenuation value is not larger than that in controllable range of the RF Up-converter, controlling the RF Up-converter to transmit a paging signal to a mobile station;

g-5) determining whether a paging acknowledgement signal is received from the mobile station or not;

g-6) if paging acknowledgement signal is received, detecting a transmission power of the paging acknowledgement signal and calculating a call completion rate of the transmission power to a transmission attenuation value;

g-7) determining whether the call completion rate of the RF Up-converter is larger than the call completion rate threshold value or not;

g-8) if the call completion rate of the RF Up-converter is larger than the call completion rate threshold value, storing the transmission attenuation value set to the RF Up-converter into the memory; and g-9) determining whether detection of the optimal transmission attenuation value for every CDMA channel necessary for the handoff between the $\beta$ and the $\gamma$ sectors is completed or not; and g-10) if the detection is completed, proceeding to the step h).

19. The method as recited in claim 18, further including the step of: g-11) if the transmission attenuation value is not larger than that in controllable range of the RF Up-converter at the step g-3), displaying a message that a transmission attenuation value changing function ends.

20. The method as recited in claim 18, further including the step of: g-12) if the call completion rate of the RF Up-converter is larger than the call completion rate threshold value at the step g-7), adjusting the transmission attenuation value to a next transmission attenuation value and proceeding to the step g-3).

21. The method as recited in claim 18, further including the step of: g-13) if the detection is not completed, selecting another sub-cell corresponding to a next CDMA channel in the $\beta$ and the $\gamma$ sectors and going back to the step g-2).

22. The method as recited in claim 1, wherein the step h) includes the steps of:

h-1) selecting a sub-cell corresponding to a CDMA channel in the $\gamma$ and the $\alpha$ sectors in case of a handoff between the $\gamma$ and the $\alpha$ sectors;

h-2) setting a transmission attenuation value of the RF Up-converter corresponding to the sub-cell as a basic value "0";

h-3) determining whether the transmission attenuation value is larger than that in controllable range of the RF Up-converter or not;

h-4) if the transmission attenuation value is not larger than that in controllable range of the RF Up-converter, controlling the RF Up-converter to transmit a paging signal to a mobile station;

h-5) determining whether a paging acknowledgement signal is received from the mobile station or not;

h-6) if paging acknowledgement signal is received, detecting a transmission power of the paging acknowledgement signal and calculating a call completion rate of the transmission power to a transmission attenuation value;

h-7) determining whether the call completion rate of the RF Up-converter is larger than the call completion rate threshold value or not;

h-8) if the call completion rate of the RF Up-converter is larger than the call completion rate threshold value, storing the transmission attenuation value set to the RF Up-converter into the memory; and h-9) determining whether detection of the optimal transmission attenuation value for every CDMA channel necessary for the handoff between the $\beta$ and the $\gamma$ sectors is completed or not; and h-10) if the detection is completed, proceeding to the step i).

23. The method as recited in claim 22, further including the step of: h-11) if the transmission attenuation value is not larger than that in controllable range of the RF Up-converter at the step h-3), displaying a message that a transmission attenuation value changing function ends.

24. The method as recited in claim 22, further including the step of: h-12) if the call completion rate of the RF Up-converter is larger than the call completion rate threshold value at the step h-7), adjusting the transmission attenuation value to a next transmission attenuation value and proceeding to the step h-3).

25. The method as recited in claim 22, further including the step of: h-13) if the detection is not completed, selecting another sub-cell corresponding to a next CDMA channel in the γ and the α sectors and going back to the step h-2).

26. The method as recited in claim 1, wherein the step i) includes the steps of:
i-1) selecting a final transmission attenuation value for each of the multiple CDMA channels in the α sector and setting the final transmission attenuation value to the corresponding RF Up-converter;
i-2) selecting a final transmission attenuation value for each of the multiple CDMA channels in the β sector and setting the final transmission attenuation value to the corresponding RF Up-converter;
i-3) selecting a final transmission attenuation value for each of the multiple CDMA channels in the γ sector and setting the final transmission attenuation value to the corresponding RF Up-converter; and
i-4) displaying the final transmission attenuation values for the CDMA channels in each of the α, β and γ sector.

27. The method as recited in claim 26, wherein the step i-1) includes the steps of:
i-1-1) reading the optimal transmission attenuation value for the CDMA channel in the α sector, which is stored in the memory;
i-1-2) reading the optimal transmission attenuation value for the CDMA channel in the α sector in case of the handoff between the and the sectors, which is stored in the memory;
i-1-3) comparing the optimal transmission attenuation value with the optimal transmission attenuation value in case of the handoff between the and the , thereby selecting one of which the call completion rate is better than that of the other, as a first final transmission attenuation value;
i-1-4) reading the optimal transmission attenuation value for the CDMA channel in the α sector in case of the handoff between the γ and the sectors, which is stored in the memory;
i-1-5) comparing the optimal transmission attenuation value with the optimal transmission attenuation value in case of the handoff between the γ and the sectors, thereby selecting one of which the call completion rate is better than that of the other, as a second final transmission attenuation value;
i-1-6) storing the second final attenuation value into the memory and setting the second final attenuation value to the corresponding RF Up-converter; and
i-1-7) determining whether detection of the optimal transmission attenuation value for every CDMA channel in the sector is completed or not; and
i-1-8) if the detection is completed, proceeding to the step i-2).

28. The method as recited in claim 27, further including the step of: i-1-9) if the detection is not completed, increasing the index value of the CDMA channel in the sector by "1" and going back to the step i-1-1).

29. The method as recited in claim 26, wherein the step i-2) includes the steps of:
i-2-1) reading the optimal transmission attenuation value for the CDMA channel in the sector, which is stored in the memory;
i-2-2) reading the optimal transmission attenuation value for the CDMA channel in the sector in case of the handoff between the and the sectors, which is stored in the memory;
i-2-3) comparing the optimal transmission attenuation value with the optimal transmission attenuation value in case of the handoff between the and the sectors, thereby selecting one of which the call completion rate is better than that of the other, as a first final transmission attenuation value;
i-2-4) reading the optimal transmission attenuation value for the CDMA channel in the sector in case of the handoff between the and the γ sectors, which is stored in the memory;
i-2-5) comparing the optimal transmission attenuation value with the optimal transmission attenuation value in case of the handoff between the and the γ sectors, thereby selecting one of which the call completion rate is better than that of the other, as a second final transmission attenuation value;
i-2-6) storing the second final attenuation value into the memory and setting the second final attenuation value to the corresponding RF Up-converter; and
i-2-7) determining whether detection of the optimal transmission attenuation value for every CDMA channel in the sector is completed or not; and
i-2-8) if the detection is completed, proceeding to the step i-3).

30. The method as recited in claim 29, further including the step of: i-2-9) if the detection is not completed, increasing the index value of the CDMA channel in the sector by "1" and going back to the step i-2-1).

31. The method as recited in claim 26, wherein the step i-3) includes the steps of:
i-3-1) reading the optimal transmission attenuation value for the CDMA channel in the γ sector, which is stored in the memory;
i-3-2) reading the optimal transmission attenuation value for the CDMA channel in the γ sector in case of the handoff between the and the γ sectors, which is stored in the memory;
i-3-3) comparing the optimal transmission attenuation value with the optimal transmission attenuation value in case of the handoff between the and the γ sectors, thereby selecting one of which the call completion rate is better than that of the other, as a first final transmission attenuation value;
i-3-4) reading the optimal transmission attenuation value for the CDMA channel in the γ sector in case of the handoff between the γ and the sectors, which is stored in the memory;
i-3-5) comparing the optimal transmission attenuation value with the optimal transmission attenuation value in case of the handoff between the γ and the sectors, thereby selecting one of which the call completion rate is better than that of the other, as a second final transmission attenuation value;
i-3-6) storing the second final attenuation value into the memory and setting the second final attenuation value to the corresponding RF Up-converter; and
i-3-7) determining whether detection of the optimal transmission attenuation value for every CDMA channel in the γ sector is completed or not; and
i-3-8) if the detection is completed, proceeding to the step i-4).

32. The method as recited in claim 31, further including the step of: i-3-9) if the detection is not completed, increasing the index value of the CDMA channel in the γ sector by "1" and going back to the step i-3-1).

* * * * *